United States Patent [19]

Salg et al.

[11] Patent Number: 4,970,943

[45] Date of Patent: Nov. 20, 1990

[54] POWER STEERING CYLINDER WITH BUILT IN CONTINUOUSLY VARIABLE STEERING ANGLE LIMITER

[75] Inventors: Ditmar Salg; Michael Paul, both of Passau, Fed. Rep. of Germany

[73] Assignee: Zahnradfabrik Friedrichshafen, AG., Friedrichshafen, Fed. Rep. of Germany

[21] Appl. No.: 298,047

[22] Filed: Jan. 18, 1989

[30] Foreign Application Priority Data

Jan. 29, 1988 [DE] Fed. Rep. of Germany ....... 3802692

[51] Int. Cl.$^5$ .............................................. F01B 31/14
[52] U.S. Cl. ...................................... 92/13.6; 92/13.5; 92/13; 92/85 B; 180/79; 180/79.3
[58] Field of Search .............. 92/13, 13.3, 13.4, 13.41, 92/13.5, 13.51, 13.6, 13.8, 85 R, 85 B, 143; 180/79, 79.3

[56] References Cited

U.S. PATENT DOCUMENTS

| | | | |
|---|---|---|---|
| 3,003,470 | 10/1961 | Geyer | 92/13.5 |
| 3,130,646 | 4/1964 | Pennington | 92/13.6 |
| 3,156,160 | 11/1964 | Meyer et al. | 92/13.6 |
| 3,815,480 | 6/1974 | Spyra | 92/13.8 |
| 4,517,878 | 5/1985 | Hashimoto et al. | 92/85 B |
| 4,558,759 | 12/1985 | Baatrub et al. | 180/79 |
| 4,646,623 | 3/1987 | Stoll | 92/13.5 |
| 4,699,044 | 10/1987 | Riggs | 92/13.6 |

FOREIGN PATENT DOCUMENTS

| | | | |
|---|---|---|---|
| 2654588 | 7/1977 | Fed. Rep. of Germany | 92/13.6 |
| 3429597 | 2/1985 | Fed. Rep. of Germany | 180/79 |
| 2231873 | 12/1974 | France | 92/13.6 |
| 0082807 | 6/1980 | Japan | 92/13.6 |

Primary Examiner—John T. Kwon
Assistant Examiner—Thomas Denion
Attorney, Agent, or Firm—Albert M. Zalkind

[57] ABSTRACT

A steering angle limiter is built into an auxiliary power steering mechanism wherein the limits of steering can be variably preset to any predetermined degree within limits in a continuous manner. The limiter is a device built into the power cylinder. Such device comprises a mechanism having threaded telescopic members. One member is axially fixed and manually rotatable by a tool exteriorly of the cylinder to axially shift the other member to a predetermined distance from a respective end of the power piston. The other member may be non-rotative and threaded to the first member or it may be rotative but threaded to the housing. In either event, it is guided for axial movement. The axial setting of the other member effects a limit stop or abutment for the moving piston for such distance of movement as desired to limit the steering angle of the vehicle wheels in a particular direction of steering. For a double acting cylinder a steering limiter as described is provided for each end of the cylinder. In one embodiment of the invention an arrangement of oil discharge channels in conjunction with a damping piston forces oil being expelled from a pressure chamber to act as a shock absorber to slow down exhaust.

All embodiments of the invention have at least one port passing radially through a telescopic member to serve as a throttle for return oil.

20 Claims, 2 Drawing Sheets

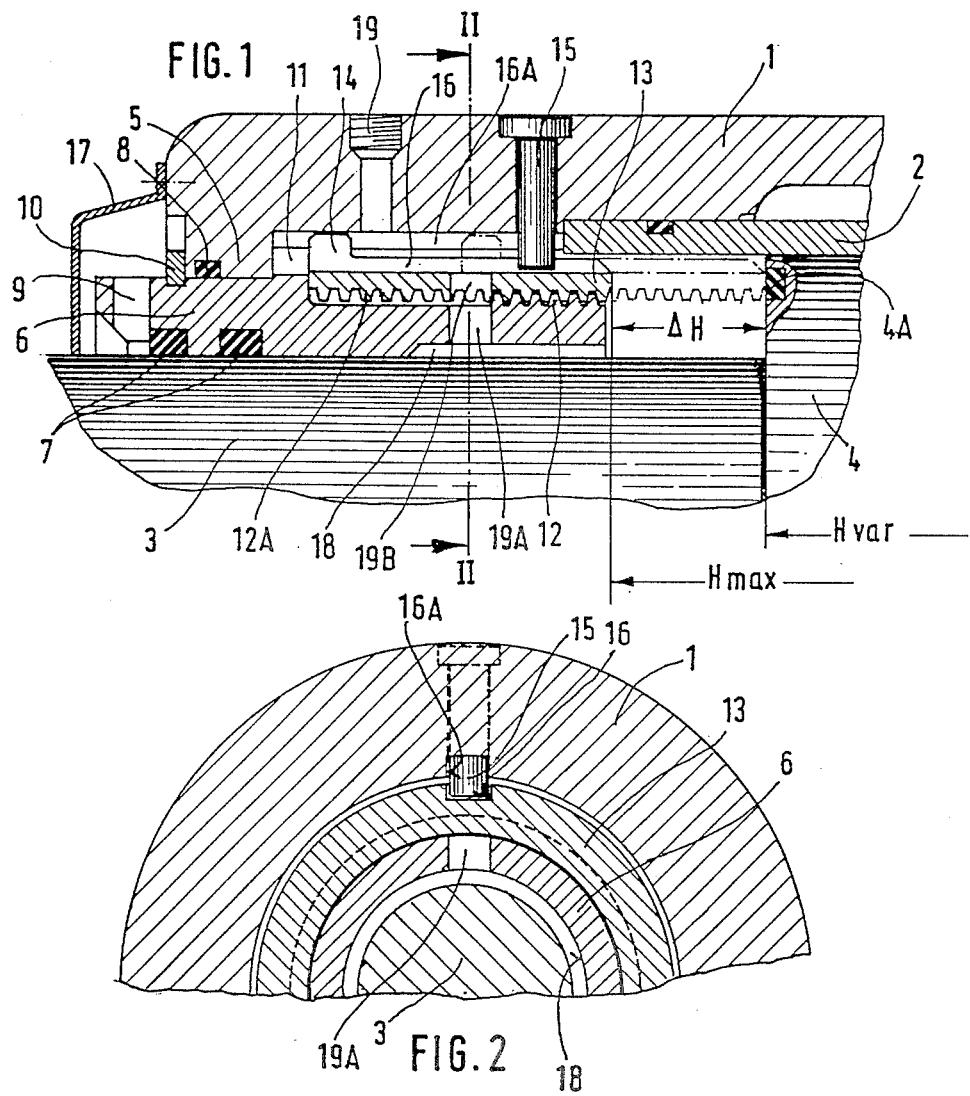

ated opposed end of FIG. 1.
POWER STEERING CYLINDER WITH BUILT IN CONTINUOUSLY VARIABLE STEERING ANGLE LIMITER The invention is concerned with an auxiliary power steering mechanism having a continuously adjustable piston motion limiter such as needed especially for vehicles with front axles, in which the piston, which is axially displaceable in a housing with piston rod traverse parallel to the front axle, must often provide varying maximum strokes, depending upon the type of vehicle and the dimensions of the tires and rims.

DE-C-32 05 979 (FIGS. 1A and B), counterpart U.S. Pat. to Maurer et. al. 4,536,003, issued Aug. 20, 1985 to assignee of present invention, shows a steering mechanism of this type. There the continuously displaceable limit stops consist of simple setscrews in the field of traverse of the tie rods. The open arrangement results in various risks having to do with safety and protection against danger, especially for tractors and construction vehicles. Furthermore, projections of corresponding dimensions must be cast on the steering housing or the axle casing and threaded drilled holes must be put in separately and individually.

Taking this as a starting point, the object of the invention is to effect a similarly cost favorable but better protected limiter construction that does not require any separate work of attaching components to an axle casing and steering parts.

This object is obtained with piston motion limiting elements located in the power cylinder steering housing and comprising telescopic sleeves wherein a limiter mechanism can be installed at each end of the housing for engaging opposite faces of a piston. No exterior limit stop construction is required and the internal coaction of the sleeves affords an advantage in providing return flow through a sleeve radial port for throttling return flow.

Except for an adjusting member at each end of the housing, all working parts are protected against dirt and damage.

In one modification, a process of putting a thread in a large steering housing that may cause problems which can be avoided in other modifications.

An axially fixed threaded sleeve is used in all embodiments adjustable externally of the housing at each end and carrying an axially movable sleeve having a coacting thread positioned to be abutted by a moving piston to limit piston traverse.

The axially fixed sleeves also have the function of sealing the interior of the housing at each end by means of ring seals between such sleeves and the bore of the housing as well as being carriers of the respective axial movement sleeves.

The sealing arrangement is particularly advantageous since the outer exterior ends of the axially fixed sleeves have apertures to receive a lever tool for rotating them to axially move the limit stop sleeves.

Further, suitable markings for adjusting to desired positions of the axially fixed sleeve can be placed around the tool receiving exterior ends and a locking device or cover provided for security.

In certain embodiments placing the coacting thread on an axial movable sleeve is simpler than machining a thread in a cast housing. Also, thread damage resulting from housing jolts on that sleeve by the piston or other jolts is minimized or avoided.

The sleeves are constructed the same for both ends of the housing, and consequently are identical, being used in a double function for piston rod seals and installation of all components from one side of the steering housing is simpler. For adjustment, e.g., a tool with lesser thickness than the exterior end of the fixed sleeve is usable. There is more space for tool use than in the outside area of the steering housing of prior art. Nor are similar contamination problems or comparable dangers of damage present such as exist on threads and stops projecting radially from the steering housing. The tool is applied against the support of the steering housing itself, which will undergo stress in any event, and is not affected to a large extent by varying axle dimensions, steering housing shapes, etc.

Further advantages will be apparent to persons skilled in the art.

In all embodiments at each end of the housing the axially fixed sleeve has a collar abutting an end wall of the housing interiorly with an exterior locking ring abutting the outer side of the end wall. The force of jolts are transmitted axially to the housing, concentrically without a reversal of direction, favorable to stability on a completely circular annular area and sound proofed by seals between the axially fixed sleeves and the piston rod.

The construction utilizing a locking guide pin inserted through the housing wall radially and engaging with its free end in a longitudinal groove in a threaded axially moving sleeve is pressure-sealed in the housing wall, the installation of the axially fixed sleeves and the coacting threaded sleeves carried on them is very simple and requires only relatively cheap, simple parts.

In a further modification where a sleeve has a radial bore in its thread for discharging the pressure agent as the piston approaches its end position, the effect of throttling of the existing pressure agent is had by the pressure chamber at the face of the piston during steering angle limitation to act as part of a hydraulic shock absorber without additional parts.

With adjustment indicaia applied adjacent an exterior knob or dial limiting positions once determined can easily be repeated.

By means of a locking or fastening device such as a safety cotter pin in a castellated nut or a clamping cover, an adjusted position can be made secure against unpermitted alteration or contamination.

FIG. 1 is the preferred form of the invention and shows one end of a longitudinal section of an auxiliary power steering mechanism with a variable piston traverse mechanism for a double acting power cylinder in a steering housing. Only one mechanism is shown and detailed. It will be understood that at the opposite side (not shown) the mechanism is duplicated in precise image assembly. In this modification the telescopic sleeves each carries a thread, the threads coacting with each other for adjustment.

FIG. 2 shows a radial section on line II—II of FIG. 1 as seen in the direction of the arrows.

FIG. 5 shows a duplication in reverse of the illustrated opposed end of FIG. 1.

FIG. 5 is illustrative of a complete combination and will be understood that such illustration is exemplary of all modifications for purposes of compliance with 37 CRF Sec. 1.83(a).

Figure 3:
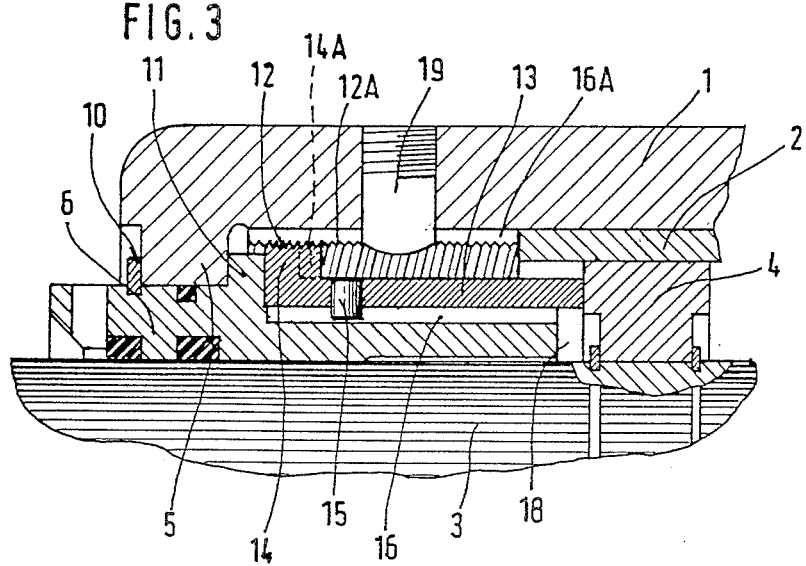
FIG. 3 shows a modification with one adjusting thread externally on the adjustable sleeve and the other thread being interiorly in the housing.

In FIG. 1, one side of a steering gear housing 1 is shown, wherein a liner sleeve, viz., cylinder 2 is fitted, in which is a piston rod 3 for double acting piston 4, the rod extending in opposite directions conventionally for a double acting cylinder. Beyond the housing 1, the piston rod sections (one shown) pass through respective end walls such as 5 at the ends of the housing 1.

At the housing end 5, the piston rod 3 is within a rotatable adjusting sleeve 6 secured axially, having shaft seals 7 on the piston rod 3 and a housing seal 8 in the housing end wall 5. Outwardly of the housing 1, sleeve 6 has a rather short axial projecting end, to form socket means to receive a tool 9 (not shown), e.g., a hooked wrench lever, or other device. Thus, the adjusting of sleeve 6 is a simple rotation not hindered by a steering gear housing, steering pivots, shock absorbers, etc., just by rotating that sleeve at the front of the steering gear housing 1. In addition, the end wall 5 locks sleeve 6 against axial displacement by external locking ring 10, and a fixed collar 11 of the sleeve, all as shown.

FIG. 1 shows an external thread 12 provided for approximately a third of the right hand end of sleeve 6 extending into the housing. This thread engages an internal thread 12A of a threaded sleeve 13 for axial movement by directional turning of the adjusting sleeve 6. At end position the left end of sleeve 13 having collar 14 abuts collar 11 of the sleeve 6. Sleeve 13 is then in its final position for the maximum piston stroke $H_{max}$ of the piston 4 towards the left. That is, towards end wall 5. By turning the sleeve 6 in the opposite direction, the threaded sleeve 13 can move axially toward the piston 4, within a stroke change range $\Delta H$ corresponding to the adjustment requirement of the moment.

Thus, an effectively shorter continuously variable piston stroke $H_{var}$ results. In FIG. 1, the greatest movement of the threaded sleeve 13 toward piston 4 for minimum piston traverse as indicated by the phantom line, is thus limited by collar 14. Collar 14, in the furthest right hand traverse of the threaded sleeve 13 would be against the exposed edge of cylinder 2, in a traverse past a locking guide pin 15 in the housing 1.

When the sleeve 6 is turned, the threaded sleeve 13 is keyed against rotating with respect to the housing 1 by the locking guide pin 15 projecting radially through the housing 1 into a groove 16 milled axially in sleeve 13 for its entire length. Collar 14 will be understood to be slotted so as to go past the locking pin 15. The locking guide pin 15 is forced into the housing wall 1 completely and sealed hermetically in any way desired. Instead of a locking guide pin 15 in the wall of the housing 1, a keying device against rotation is shown in phantom in FIG. 1 with the extended phantom position of sleeve 13. This is additively usable wherein a short key projects radially from the threaded sleeve 13 and slides in the housing 1 in a longitudinal keyway groove 16A. Both arrangements are shown in FIG. 1. However, groove 16A in the housing 1 can be omitted if locking guide pin 15 is used.

For assembly purposes a slot (no reference number) alined with the longitudinal groove 16 in the sleeve 13 is provided through the collar 11 which collar positions the adjusting sleeve 6 axially. These two alined longitudinal grooves 16 and 16A make it possible to slide the adjusting sleeve 6, with the threaded sleeve 13 screwed onto it past the locking guide pin 15 from the right hand end (not shown) to the left end of the housing 1 for placement as seen in FIG. 1 even though the locking guide pin is in position. After the sleeve 6 has been inserted with its sleeve 13, the sleeve for cylinder 2 is inserted into the housing 1 through the right hand end of the housing 1.

Groove 16A cut in the inner wall of the housing 1 radially above the sleeve 13 drains the oil off to the oil connection 19 even when the collar 14 is covering it since collar 14 is slotted.

It will be understood that each end of the housing has a port 19 for reversible pressure and return flow. Thus, sleeves 6 and 13 and coacting parts are in this instance constructed the same for both ends of a power cylinder or steering gear housing 1 for a double acting cylinder. The external face of the housing end 5 and sleeve 6 at each end can be provided with markings (not shown) that make it possible to repeatedly find optimal limit traverse adjustments in accordance with a required stroke size quickly and identically. Thus, adjustment values that have been determined as desirable can be reproduced quickly without measuring again. A safeguard against unauthorized adjustments similar, e.g., to a castellated nut with a cotter pin, conventionally known, can be provided at the exterior end of sleeve 6, or a safeguard against contamination or damage can be provided by a cover 17 capable of being slipped over the front of the sleeve outwardly of the housing end 5.

In FIG. 2, the housing 1 with the locking pin 15 is shown in section, and the radially alined longitudinal grooves 16, 16A in the threaded sleeve 13 and housing 1 can be seen above the radial bore 19A in the sleeve 6. The locking guide pin 15 inserted radially in the housing 1 is sealed hermetically in the housing wall in any suitable manner.

In FIG. 3, like parts have like or somewhat similar reference numerals as in FIG. 2. The outer thread 12 of the threaded sleeve 13 engages an inner thread 12A machined into the inner wall of the housing 1 or in an insert (not shown) in the housing. The sleeve 13 extends in limiting position from the cylinder sleeve 2 to the housing end 5 of the housing 1. In addition, for approximately the first fifth of its length adjacent end wall 5, the threaded sleeve 13 has a radially projecting collar 14 carrying the outer thread 12 close to the collar 11 of the adjusting sleeve 6. This is maximum stroke of the piston 4 toward the left as shown. This is effected by setting sleeve 13 in position with the adjusting sleeve 6, so that the right hand end of sleeve 13 abuts the piston as shown, at the end of the piston stroke.

A recess 14A is shown to provide convenience in receiving an adjusting tool during assembly.

A guide pin 15' is provided in the threaded sleeve 13. The pin slides in a groove 16' in the adjusting sleeve 6. Rotation of sleeve 6 causes sleeve 13 to have relative rotation with the housing to move sleeve 13 reciprocally due to coaction of the respective threads.

In this embodiment, the outside diameter of the threaded sleeve 13 is smaller than the inside diameter of the sleeve 2 for the housing.

The dimensions chosen for the threaded sleeve 13 are such that, in the final withdrawn position of its right hand end, it projects toward the cylinder 2 but with its stop edge for engaging the piston being beyond the front edge of the adjusting sleeve 6.

The inner thread 12A within the housing 1 can be machined directly into the housing 1 or be fastened in it as a threaded insert. Since the oil port 19 is disposed radially above the thread, the thread has a corresponding opening and is provided with a radial bore 19B that ensures a good discharge of oil to the oil port 19 even when the piston 4 is approaching its final position.

Figure 4:
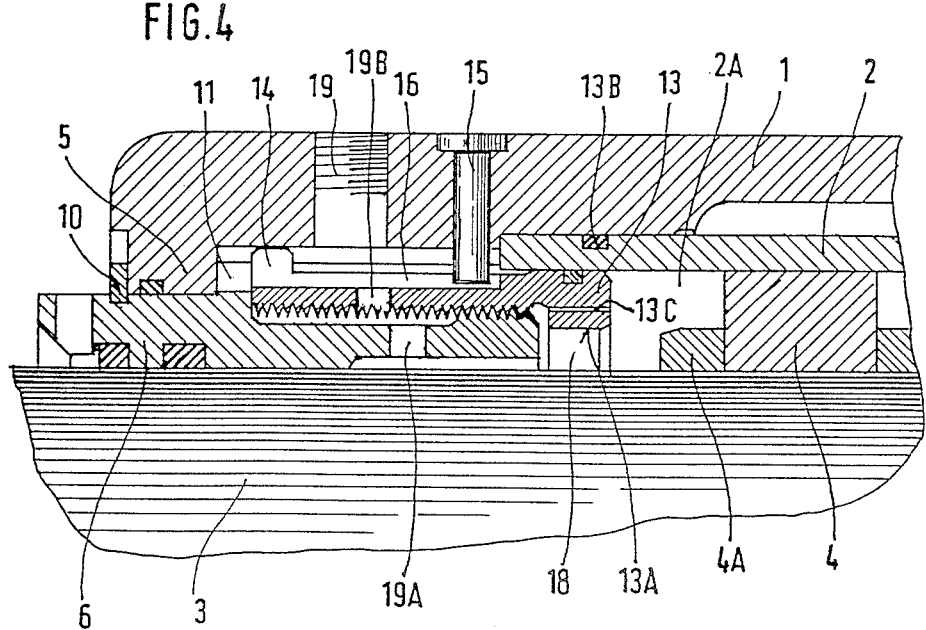
FIG. 4 shows another modification with integrated shock absorption.

In FIG. 4, the steering angle limiter of the invention is constructed so as to effect a hydraulic shock absorber for return oil.

Sleeve 13 has an open end port 13A at the leading edge beyond the thread 12 facing piston 4 and ahead of the oil port 19. Furthermore, the piston 4 is provided on its face with a damping or cushioning piston collar 4B which slides into the port 13A at the forefront of the sleeve 13. Port 13A is within an internal shoulder of sleeve 13.

Collar 4B has a smooth fit within port 13A as the piston 4 reaches its final position effecting a seal therein.

A sealing ring 13B is provided between the cylinder liner 2 and the sleeve 13 above port 13A to prevent rapid emptying of chamber 2A independently of the throttling path formed by the radial bores 19A and 19B.

Severe hydraulic shock to the components can be safely forestalled in this way without any need for additional complexity nor expense plus a need for more space.

In operation, as the piston 4 approaches sleeve 13, the damping piston 4B on the face of piston 4 moves sealingly into port 13A of sleeve 13. This seals off the end of the housing beyond cylinder liner 2, there being the ring seal 13B between the housing and cylinder 2.

However, piston 4 is permitted a continuing movement by return flow through small passage means, one or several bores such as bore 13C through the front edge shoulder of port 13A. Bore 13C is exposed to pressure chamber 2A in which piston 4 is still moving toward sleeve 13 as a limit stop. This has a shock absorption effect. Bores (or bore) 13C can be predetermined by insertion of tubular sleeves having selected diameter bores into pre-drilled bores through the shoulder.

Additional shock absorption can is also be obtainable by using housing shapes, in which no increased internal pressure is present against sleeve 13, if a soft plastic ring cushion such as 4A (FIG. 1) is provided in the face of the piston 4 or the internal edge shoulder of sleeve 13 to cushion the engagement that limits piston traverse.

A stroke change of Δ H takes place in FIG. 4 as in all embodiments of the invention by rotating the sleeve 6 with a tool in an aperture at the exterior end of sleeve 6. Such rotation telescopes the threaded sleeve 13 on the thread 12 either toward or away from the piston 4 depending upon the direction of rotation, all as seen on FIG. 1.

In FIG. 4, sleeve 6 projects axially into chamber 2A, a distance approximately twice the maximum stroke range Δ H that is desired. The adjustment depends upon the arrangement of the steering mechanism of the vehicle. This is a matter of matching the available space for the steered wheels with adjustment of a stroke extent determined by the piston abutting the edge of the threaded sleeve 13 wherever set. Maximum stroke is limited by collar 14 abutting collar 11. The locking guide pin 15 ensures that the threaded sleeve 13 has only axial movement.

In FIG. 5 the right side end of the cylinder for FIG. 1 shows the same piston travel adjustments which will be understood to exemplify the right side end of the other embodiments.

FIG. 5 has reference numbers 3, 4, 6 and 13 as found in the other embodiments, FIGS. 3 and 4.

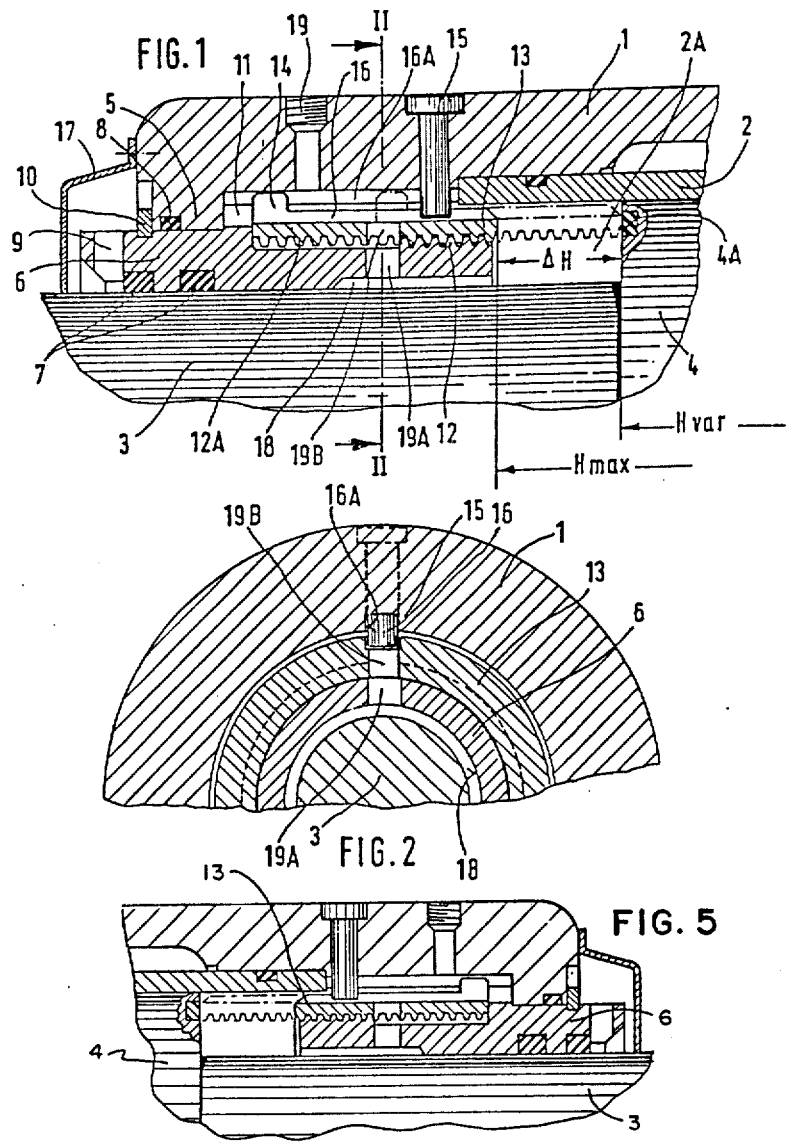

We claim:

1. An auxiliary steering mechanism comprising a pressure power cylinder housing (1) having a power piston (4) with a steering angle limiter for varying the stroke of said piston to predetermine the steering angle; the improvement wherein said limiter is within said power cylinder housing and comprises a pair of relatively telescopic sleeves (6, 13) and having means (10, 11) for holding one such sleeve (6) axially fixed in said housing and rotative; thread means (12, 12A) to telescopically adjust said sleeves and means (15, 16) (15', 16') for effecting axial motion of said other sleeve (13) by operation of said thread means upon an adjusting rotation of said one sleeve (6) therein said other sleeve (13) is axially adjusted to a position in said housing to be abutted by said moving piston for effecting a predetermined steering angle limit stop; said power cylinder housing having an interior thread (12B); and exterior thread (12) on said other sleeve (13); means (15', 16') between said sleeves for effecting rotation of said other sleeve (13) upon adjusting rotation of said one sleeve (6) for positioning in the path of said piston.

2. A steering mechanism as set forth in claim 1, said one sleeve (6) having a longitudinal groove (16'); said other sleeve (13) having a pin (15') extending into said groove (16') and being slidably therein to maintain non-rotative relative movement between said sleeves; including a longitudinal groove (16A) in the exterior thread (12B) of said other sleeve (13); passage means for conducting exhaust oil through said latter groove from said cylinder outwardly thereof.

3. An auxiliary steering mechanism comprising a pressure power cylinder housing (1) having a power piston (4) with a steering angle limiter for varying the stroke of said piston to predetermine the steering angle; the improvement wherein said limiter is within said power cylinder housing and comprises a pair of relatively telescopic sleeves (6, 13) and having means (10, 11) for holding one such sleeve (6) axially fixed in said housing and rotative; thread means (12, 12A) to telescopically adjust said sleeves and means (15, 16) (15', 16') for effecting axial motion of said other sleeve (13) by operation of said thread means upon an adjusting rotation of said one sleeve (6) therein said other sleeve (13) is axially adjusted to a position in said housing to be abutted by said moving piston for effecting a predetermined steering angle limit stop; said other sleeve (13) having a longitudinal groove (16) and a guide pin (15) carried by said power cylinder housing into said groove for maintaining axial non-rotative movement of said other sleeve (13).

4. An auxiliary steering mechanism comprising a pressure power cylinder housing (1) having a power piston (4) with a steering angle limiter for varying the stroke of said piston to predetermine the steering angle; the improvement wherein said limiter is within said power cylinder housing and comprises a pair of relatively telescopic sleeves (6, 13) and having means (10, 11) for holding one such sleeve (6) axially fixed in said housing and rotative; thread means (12, 12A) to telescopically adjust said sleeves and means (15, 16) (15', 16') for effecting axial motion of said other sleeve (13) by operation of said thread means upon an adjusting rotation of said one sleeve (6) therein said other sleeve (13) is axially adjusted to a position in said housing to be abutted by said moving piston for effecting a predetermined steering angle limit stop; including throttle bores (19A, 19B) through said sleeves in communication with each other; said power cylinder housing having a pressure chamber (2A) communicating with said bores; and an oil bore (19) communicating with said bores whereby exhaust oil from said pressure chamber can pass between said sleeves through said bores into said exit bore.

5. A steering mechanism as set forth in claim 4 including a damping piston (4B) at the front face of said piston (4) and a port (13A) closely fitting said damping piston and communicating between said pressure chamber (2A) and said throttle bores (19A, 19B) wherein said damping piston moves into said port to force oil from said pressure chamber through said throttle bores for cushioning said power piston (4) in approaching its limit stop position.

6. A steering mechanism as set forth in claim 5, said port being formed on the inner end of said other sleeve (13).

7. In a steering mechanism as set forth in claim 6, including an additional throttle bore (13C) in said other sleeve (13) shunting said port (13A) and operative to pass exhaust oil flow after said damping piston (40) has closed said
port (13A) while said pressure piston (4) is still moving.

8. In a steering mechanism as set forth in claim 7, said additional throttle bore being of greater restriction to flow than said sleeve bores (19A, 19B) to reduce the velocity of said power piston in approaching abutment with said other sleeve (13).

9. An auxiliary steering mechanism comprising a pressure power cylinder housing (1) having a power piston (4) with a steering angle limiter for varying the stroke of said piston to predetermine the steering angle; the improvement wherein said limiter is within said power cylinder housing and comprises a pair of relatively telescopic sleeves (6, 13) and having means (10, 11) for holding one such sleeve (6) axially fixed in said housing and rotative; thread means (12, 12A) to telescopically adjust said sleeves and means (15, 16) (15', 16') for effecting axial motion of said other sleeve (13) by operation of said thread means upon an adjusting rotation of said one sleeve (6) therein said other sleeve (13) is axially adjusted to a position in said housing to be abutted by said moving piston for effecting a predetermined steering angle limit stop; including throttle bores (19A, 19B) in said sleeves in communication with each other; said power cylinder having a pressure chamber (2A) communicating with said bores whereby exhaust from said pressure chamber can pass between said sleeves through said bores into said exit port; said piston (4) having a piston rod (3) wherein said one sleeve (6) has an internal wall of a diameter to effect an annular spacing (18) around said piston rod communicating between said pressure chamber (2A) and a throttle bore (19A) in said one sleeve.

10. An auxiliary steering mechanism comprising a pressure power cylinder housing (1) having a power piston (4) with a steering angle limiter for varying the stroke of said piston to predetermine the steering angle; the improvement wherein said limiter is within said power cylinder housing and comprises a pair of relatively telescopic sleeves (6, 13) and having means (10, 11) for holding one such sleeve (6) axially fixed in said housing and rotative; thread means (12, 12A) to telescopically adjust said sleeves and means (15, 16) (15', 16') for effecting axial motion of said other sleeve (13) by operation of said thread means upon an adjusting rotation of said one sleeve (6) therein said other sleeve (13) is axially adjusted to a position in said housing to be abutted by said moving piston for effecting a predetermined steering angle limit stop; said one sleeve (6) having a longitudinal groove (16'); said other sleeve (13) having a pin (15') extending into said groove (16') and being slidably therein to maintain non-rotative relative movement between said sleeves; including a longitudinal groove (16A) in the interior thread (12A) of said power cylinder housing; means for conducting exhaust oil through said latter groove from said cylinder housing outwardly thereof; said other sleeve (13) extending beyond said one sleeve (6) interiorly into said power cylinder housing (1) so as to effect a radial space ('18) communicating with said last mentioned longitudinal groove (16A) to conduct exhaust oil thereinto as said piston approaches said other sleeve.

11. An auxiliary steering mechanism comprising a pressure power cylinder housing (1) having a power piston (4) with a steering angle limiter for varying the stroke of said piston to predetermine the steering angle: the improvement wherein said limiter is within said power cylinder housing and comprises a pair of relatively telescopic sleeves (6, 13) and having means (10, 11) for holding one such sleeve (6) axially fixed in said housing and rotative; thread means (12, 12A) to telescopically adjust said sleeves and means (15, 16) (15', 16') for effecting axial motion of said other sleeve (13) by operation of said thread means upon an adjusting rotation of said one sleeve (6) wherein said other sleeve (13) is axially adjusted to a position in said housing to be abutted by said moving piston for effecting a predetermined steering angle limit stop; a piston rod (3) extending axially from both sides of said piston and extending through a pair of said sleeves at each side of the housing through the respective end wall at each side for parallelism with a vehicle axle.

12. A steering mechanism as set forth in claim 11, at least one radial bore in each sleeve at each end of said housing and being in communication with each other for carrying flow from a housing chamber (2A) at a respective side of the piston to an oil port (19) at a respective end of said housing wherein at least one of said bores at each end of said housing is a throttle bore for throttling flow from said chamber.

13. A steering mechanism as set forth in claim 11, a port 19 at each side of said housing for pressure and return oil, at least one radial throttling bore 19B in a sleeve at each side of said housing in communication with said port for return oil flow from a housing chamber (2A) at a respective side of the piston.

14. A steering mechanism as set forth in claim 13; said one sleeve (6) having a longitudinal groove (16'); said other sleeve (13) having a pin (15') extending into said groove (16') and being slidably therein to maintain non-rotative relative movement between said sleeves; including a longitudinal groove (16A) in the exterior thread (12B) of said other sleeve (13); passage means for conducting exhaust oil through said latter groove from said cylinder outwardly thereof.

15. A steering mechanism as set forth in claim 13, including throttle bores (19A, 19B) through said sleeves in communication with each other; said power cylinder having a pressure chamber (2A) communicating with said bores; and an oil exit bore (19) communicating with said bores whereby exhaust oil from said pressure chamber can pass between said sleeves through said bores into said exit bore.

16. A steering mechanism as set forth in claim 13, including a damping piston (4B) at the front face of said piston (4) and a port (13A) closely fitting said damping piston and communicating between said pressure chamber (2A) and said throttle bores (19A, 19B) wherein said damping piston moves into said port to force oil from said pressure chamber through said throttle bores for cushioning said power piston (4) in approaching its limit stop position.

17. A steering mechanism as set forth in claim 16, said port being fored on the inner end of said other sleeve (13).

18. A steering mechanism as set forth in claim 13, said one sleeve (6) having a longitudinal groove (16'); said other sleeve (13) having a pin (15') extending into said groove (16') and being slidably therein to maintain non-rotative relative movement between said sleeves; including a longitudinal groove (16A) in the interior thread (12A) of said power cylinder housing; means for conducting exhaust oil through said latter groove from said cylinder/housing outwardly thereof; said other sleeve (13) extending beyond said one sleeve (6) interiorly into to said power cylinder housing (1) so as to effect a radial space (18') communicating with said last mentioned longitudinal groove (16A) to conduct exhaust oil thereinto as said piston approaches said other sleeve.

19. In a steering mechanism as set forth in claim 17, including an additional throttle bore (13C) in said other sleeve (13) shunting said port (13A) and operative to pass exhaust oil flow after said damping piston (40) has closed said port (13A) while said pressure piston (4) is still moving.

20. In a steering mechanism as set forth in claim 19, said additional throttle bore being of greater restriction to flow than said sleeve bores (19A, 19B) to reduce the velocity of said power piston in approaching abutment with said other sleeve (13).

* * * * *

UNITED STATES PATENT AND TRADEMARK OFFICE
CERTIFICATE OF CORRECTION

Page 1 of 2

PATENT NO.   :   4,970,943

DATED        :   November 20, 1990

INVENTOR(S)  :   Ditmar Salg and Michael Paul

It is certified that error appears in the above-identified patent and that said Letters Patent is hereby corrected as shown below:

The sheet of drawings consisting of Figs. 1, 2 and 5 should be added as shown on the attached sheet.

Signed and Sealed this

Twentieth Day of October, 1992

Attest:

DOUGLAS B. COMER

Attesting Officer   Acting Commissioner of Patents and Trademarks